(No Model.)
M. F. ANDERSON & W. A. BENSON.
CORN CULTIVATOR AND PULVERIZER.
No. 540,293. Patented June 4, 1895.
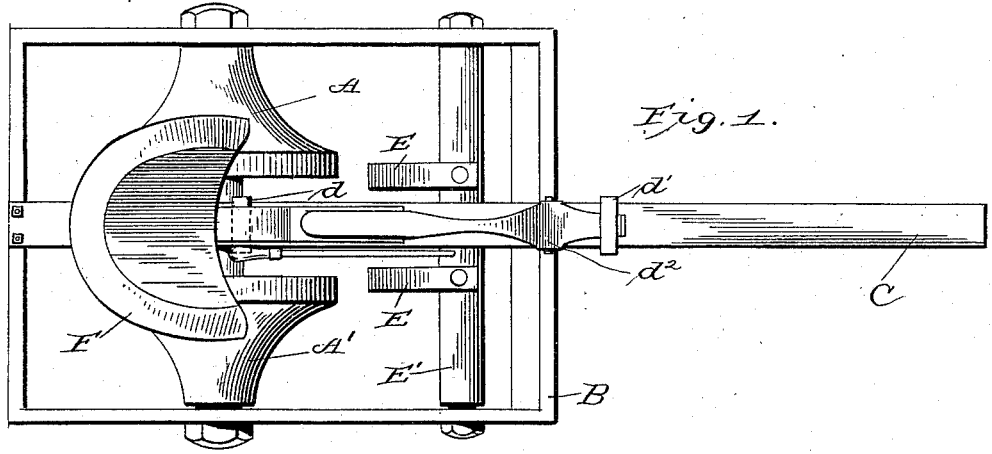
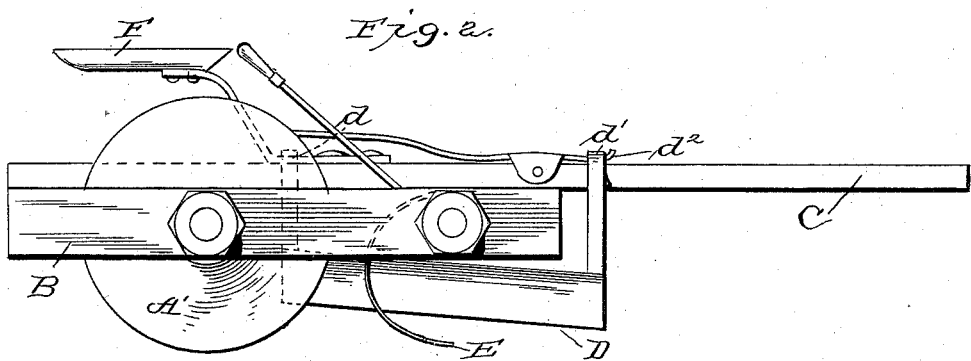
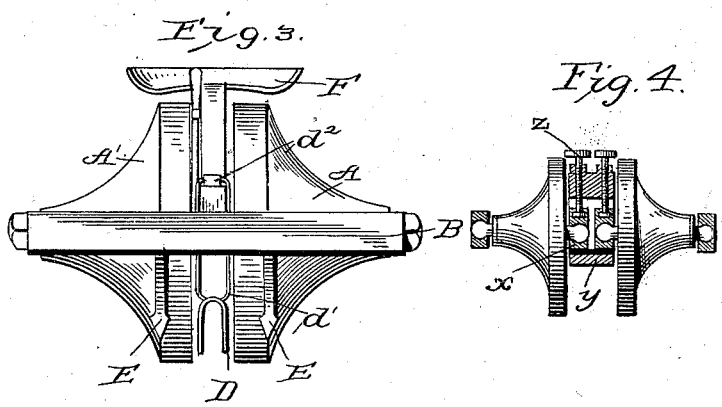
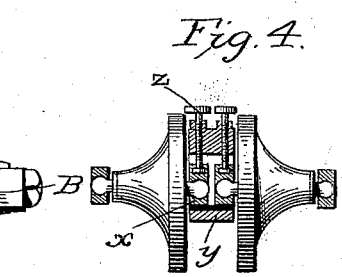
Inventors:
Millord F. Anderson
William A. Benson
By Ellis Spear
Atty
Attest
Walter N. Donaldson
F. L. Middleton

UNITED STATES PATENT OFFICE.

MILLORD F. ANDERSON AND WILLIAM A. BENSON, OF CORNING, IOWA.

CORN-CULTIVATOR AND PULVERIZER.

SPECIFICATION forming part of Letters Patent No. 540,293, dated June 4, 1895.

Application filed June 22, 1894. Serial No. 515,345. (No model.)

*To all whom it may concern:*

Be it known that we, MILLORD F. ANDERSON and WILLIAM A. BENSON, citizens of the United States of America, residing at Corning, in the county of Adams and State of Iowa, have invented certain new and useful Improvements in Corn-Cultivators and Pulverizers, of which the following is a specification.

It has been found that in the use of the listing plow in raising corn, the lumps of dirt which are thrown upward and outward upon each side have a tendency to roll back again into the center or bottom of the furrow or ditch, and these lumps render it almost impossible to cultivate the corn which is planted in the bottom of the furrow until it has grown to a considerable size. It is the object of our present invention to provide a device for obviating this difficulty, the device being designed for a pulverizer and corn cultivator. We have shown such a device in the accompanying drawings, in which—

Figure 1 is a plan view of the device. Fig. 2 is an elevation of the same, and Fig. 3 is a front view. Fig. 4 is a view of a pair of adjustable rollers.

The device consists essentially of two conical rollers A A' journaled in a frame B, with their larger ends in proximity to each other. The frame is provided with a suitable tongue or beam C by means of which horses may be hitched directly to the beam and the device drawn along, and when so drawn the rollers are designed to travel in the furrow, and their inclined faces will effectually roll down or pulverize any lumps which would otherwise tend to roll into the center of the furrow. Extending forward from between the conical rollers is a shield D of inverted U shape in cross section which is designed to travel in the furrow and guide the rollers therein as the side walls of the shield will prevent lateral movement of the beam and frame. The shield is supported by loops $d\ d'$ which embrace the tongue and the front one $d'$ is connected with a suitable lever $d^2$ which extends into convenient reach of the operator and by means of which the shield may be raised when the device is to be removed from the furrow.

Upon each side of the shield forward of the rollers we find it desirable to place small shovels E which serve to shovel or cultivate the ridge or portion of the bank upon each side which is undisturbed by the listing plow. These shovels are mounted upon a rocking shaft E' provided with a suitable handle or lever by means of which they may be raised and lowered vertically.

F represents a suitable seat for an operator when desired.

In Fig. 4, we show that the rollers may be adjustably journaled so that they may be inclined relative to each other, throwing their upper edges apart and their lower edges toward each other. By this means the rollers may be set to run level on the bottom of the furrow or on the part on which they roll and thus keep the machine from tipping over when moving it from one place to another. The adjustment is effected by mounting the journals in boxes X vertically adjustable in suitable ways Y by the screw Z. It will be understood that the adjustment may be effected in various ways, the form shown being merely one instance.

We claim as our invention—

1. A device for rolling the sides of furrows comprising a frame having a pair of conical rollers arranged independently of each other having their large ends located in proximity to each other, substantially as described.

2. In combination, the frame, the conical rollers journaled therein with their large ends in proximity to each other, and the guiding shield extending forward of said rollers from between the same, substantially as described.

3. In combination, the frame, the conical rollers journaled therein, the shield extending forward from between said rollers, the rocker shaft journaled in said frame and the shovel attached rigidly thereto and depending therefrom upon each side of said shield, substantially as described.

4. In combination, the rectangular frame, the rollers journaled therein, the rocker shaft also journaled within said frame, shovels attached to and depending from said shaft and a guiding shield between said shovels, said shield being adjustable in relation to said frame, substantially as described.

5. In combination, the frame, the conical rollers and the adjustable bearings therefor whereby each of said rollers may be inclined relatively to each other, substantially as described.

In testimony whereof we affix our signatures in presence of two witnesses.

M. F. ANDERSON.
     WM. A. BENSON.

Witnesses:
 F. H. SCRANTON,
 LUTIE M. CRAFT.